Patented Aug. 19, 1924.

1,505,551

UNITED STATES PATENT OFFICE.

CASIMIR FUNK AND LOUIS FREEDMAN, OF NEW YORK, N. Y., ASSIGNORS TO HERMAN A. METZ, OF NEW YORK, N. Y.

METHOD OF PREPARING VITAMINE-FREE PRODUCTS AND FOODSTUFFS.

No Drawing.   Application filed May 25, 1922.   Serial No. 563,666.

*To all whom it may concern:*

Be it known that we, CASIMIR FUNK and LOUIS FREEDMAN, citizens of the United States, residing at New York city, in the county of New York and State of New York, have invented certain new and useful Improvements in Methods of Preparing Vitamine-Free Products and Foodstuffs, of which the following is a specification.

This invention relates to the preparation of foodstuffs or nutritive materials and other biological products which can be dissolved either in alkali, acids or water and which are free from vitamines.

In experimental work for determining the value of materials as foods and particularly for determining the effect of substances known as vitamines in the materials, the effect of materials containing vitamines upon living organisms is compared with the effect of materials free from vitamines. It is desirable in such work to compare the effects of a material containing vitamines with the same material free from vitamines. It is an object of our invention to prepare vitamine-free materials for this purpose, it being understood however, that the invention is not limited to any particular use of the materials.

The process is particularly designed for the treatment of alkali, acid or water-soluble biological materials, such as, casein, gelatin, and other proteins and comprises principally the destruction and adsorption of the vitamine content of the material and the separation or reclamation of the vitamine-free material.

For destroying the vitamine content of the material oxidizing agents may be employed which do not destroy the material or contaminate it with undesirable impurities. As oxidizing agents may be mentioned oxygen, ozone and hydrogen peroxid.

Various adsorbing agents may be employed among which are fuller's earth, kieselguhr and charcoal.

The invention is illustrated in the following example of an application of the process for the preparation of vitamine-free casein.

Example: 100 grams of casein are converted into a solution of sodium caseinate in the usual manner and about 330 cubic centimeters of a 3 per cent solution of hydrogen peroxid is added, the total volume being one litre. The solution is then shaken with fuller's earth for several hours and filtered. The filtrate is treated with acetic acid in quantity sufficient to decompose the sodium caseinate and precipitate the casein which is then separated from the reaction mixture. The casein so prepared is substantially free from vitamines.

We claim:

1. Process of preparing vitamine-free proteins which comprises, treating vitamine containing proteins with hydrogen peroxid and fuller's earth, and separating the fuller's earth with adsorbed material from the proteins.

2. Process of preparing vitamine-free water-soluble biological products which comprises, mixing hydrogen peroxid with a solution of vitamine containing biological material, agitating the mixture with an insoluble adsorbent, and separating the adsorbent from the solution.

3. Process of preparing vitamine-free casein which comprises, forming a solution of sodium caseinate, treating the solution with hydrogen peroxid and fuller's earth, separating the solution from the fuller's earth, and recovering casein from the solution.

In testimony whereof, we affix our signatures.

CASIMIR FUNK.
LOUIS FREEDMAN.